US010686854B2

(12) United States Patent
Scott

(10) Patent No.: US 10,686,854 B2
(45) Date of Patent: Jun. 16, 2020

(54) STREAMING CONTENT USING AD HOC NETWORKS OF USER DEVICES

(71) Applicant: Verizon Patent and Licensing Inc., Arlington, VA (US)

(72) Inventor: Joseph E. Scott, Flower Mound, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 776 days.

(21) Appl. No.: 14/198,200

(22) Filed: Mar. 5, 2014

(65) Prior Publication Data
US 2015/0256575 A1    Sep. 10, 2015

(51) Int. Cl.
*H04W 84/18* (2009.01)
*H04L 29/06* (2006.01)
*G06Q 20/14* (2012.01)

(52) U.S. Cl.
CPC ....... *H04L 65/4076* (2013.01); *G06Q 20/145* (2013.01); *H04W 84/18* (2013.01)

(58) Field of Classification Search
CPC ............. H04L 12/2801; H04L 12/2861; H04L 41/5003; H04L 41/5019; H04L 41/5029; H04L 47/762; H04L 12/14; H04L 47/52; H04L 65/4076; H04L 29/08306; H04W 48/16; H04W 8/005; H04W 36/0011; H04W 76/023; H04W 74/002; H04W 84/18; G06Q 50/01
See application file for complete search history.

(56) References Cited

U.S. PATENT DOCUMENTS

| 8,437,790 | B1* | 5/2013 | Hassan | H04W 72/044 370/329 |
| 8,576,846 | B2* | 11/2013 | Kumar | H04L 63/0428 370/392 |
| 2002/0161898 | A1* | 10/2002 | Hartop | H04L 69/329 709/227 |
| 2007/0282989 | A1* | 12/2007 | Milstein et al. | 709/223 |
| 2009/0150557 | A1* | 6/2009 | Wormley et al. | 709/231 |
| 2010/0161752 | A1* | 6/2010 | Collet et al. | 709/216 |

(Continued)

OTHER PUBLICATIONS

What is the difference between a P2P network and an ad-hoc network by Darshan ShankarDarshan Shankar, Dec. 6, 2012; 1 page.*

(Continued)

*Primary Examiner* — Samica L Norman
*Assistant Examiner* — Mary M Gregg

(57) ABSTRACT

Content, such as video content, may be shared by a user device that is participating in an ad hoc network via a short range local wireless connections. In one implementation, a method may include joining, by a user device and via direct wireless communication with other user devices, an ad hoc network including the other user devices; receiving, by the user device, a content stream from a cellular wireless network; transmitting, by the user device, an indication of the received content stream to the other user devices in the ad hoc network; receiving, by the user device and from one or more of the other user devices in the ad hoc network, a request for the content stream; forwarding, by the user device and based on the received request, the content stream to the one or more of the other user devices in the ad hoc network; and presenting, by the user device, the content stream to a user of the user device.

20 Claims, 9 Drawing Sheets

(56) References Cited

U.S. PATENT DOCUMENTS

| | | | | |
|---|---|---|---|---|
| 2012/0157121 | A1* | 6/2012 | Li | G01S 5/0018 |
| | | | | 455/456.2 |
| 2012/0206557 | A1* | 8/2012 | Ridges et al. | 348/14.02 |
| 2013/0031210 | A1* | 1/2013 | Redmond | 709/218 |
| 2013/0157692 | A1* | 6/2013 | Hall | H04L 12/1845 |
| | | | | 455/456.3 |
| 2013/0322268 | A1* | 12/2013 | Shaw et al. | 370/252 |
| 2014/0040421 | A1* | 2/2014 | Baldwin | H04L 45/24 |
| | | | | 709/217 |
| 2014/0241315 | A1* | 8/2014 | Niu | H04L 67/1091 |
| | | | | 370/331 |

OTHER PUBLICATIONS

Enhancing Cellular Multicast Performance using Ac Hoc Networks; by Park et al; 7 pages 2005; www.cs.utah.edu/~kasera/myPapers/wcnc_2005.pdf.*

Providing Efficient Service Discovery in Wireless Ad Hoc and Personal Networks by Atanasovski et al.; Nov. 24, 2005; 4 pages.*

P2P IP Telephony over wireless ad-hoc networks; Peer-to-Peer Networking and Applications Dec. 2012, vol. 5, Issue 4, pp. 363-383; Nehdi et al.*

Composable ad hoc location-based services for heterogeneous mobile clients by Hodes et al; Computer Science Division, University of California, Berkeley, CA, 94720, USA (1999) 17 pages.*

Device Discovery in Short-Range Wireless Ad Hoc Networks (2002) by popovski et al. ; Center for Personkommunikation, Aalborg University Fredrik Bajers Vej 7A5, DK-9220 Aalborg, Denmark {petarp, tatiana, liljanag, prasad}@cpk.auc.dk; 5 pages; citeseerx.ist.psu.edu/viewdoc/summary?doi=10.1.1.11.8535.*

Ad Hoc Network; 3 pages by www.tech-faq.com/ad-hoc-network.html; Mar. 25, 2012.*

* cited by examiner

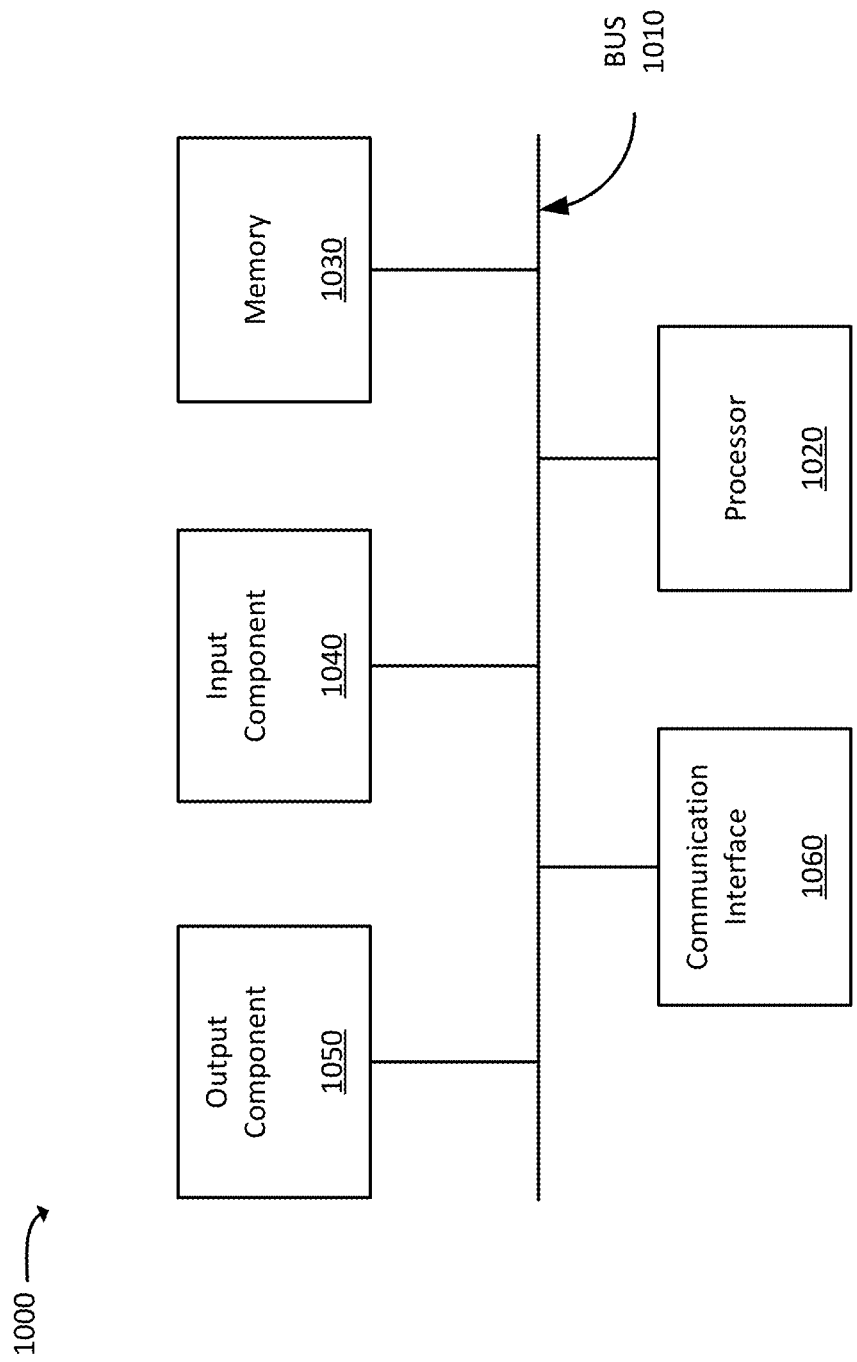

STREAMING CONTENT USING AD HOC NETWORKS OF USER DEVICES

BACKGROUND

Wireless and wired networks may be used to provide a wide variety of services to customers. For example, a telecommunications provider may implement networks that provide services relating to content delivery (e.g., streaming video and audio delivery). Content may be delivered to customers of the telecommunications provider using content delivery techniques such as over-the-top ("OTT") content delivery or content delivery that is more closely integrated within the underlying network.

Due to the relatively high bandwidth required by video, the streaming of video content can strain the capacity of the underlying network. Some network links, such as links associated with the radio access network ("RAN") in a cellular telecommunications network, may be particularly sensitive to high bandwidth content streams.

BRIEF DESCRIPTION OF THE DRAWINGS

FIG. 10 is a diagram of example components of a device.

DETAILED DESCRIPTION OF PREFERRED EMBODIMENTS

The following detailed description refers to the accompanying drawings. The same reference numbers in different drawings may identify the same or similar elements.

Techniques described herein may provide for the sharing of content, such as video content, by a user device (e.g., a smart phone) that is participating in an ad hoc network via a short range local wireless connections (e.g., Bluetooth® or WiFi connections). The user device may receive the content from a base station in a cellular wireless network. The user device may forward the content to one or more other user devices, which may or may not be connected to the cellular wireless network, for viewing of the content. The other user devices may be coupled to the user device in an ad hoc network. In some implementations, the creation of the ad hoc network and/or the forwarding of the content may be initiated based on common membership in social networks associated with the user device and the other user devices. Also, in some implementations, billing for the content, such as billing for the bandwidth needed to download the content to the destination user device, may be adjusted to incentivize sharing of content via the ad hoc network and to thus reduce network strain on the RAN of the cellular network.

Figure 1:
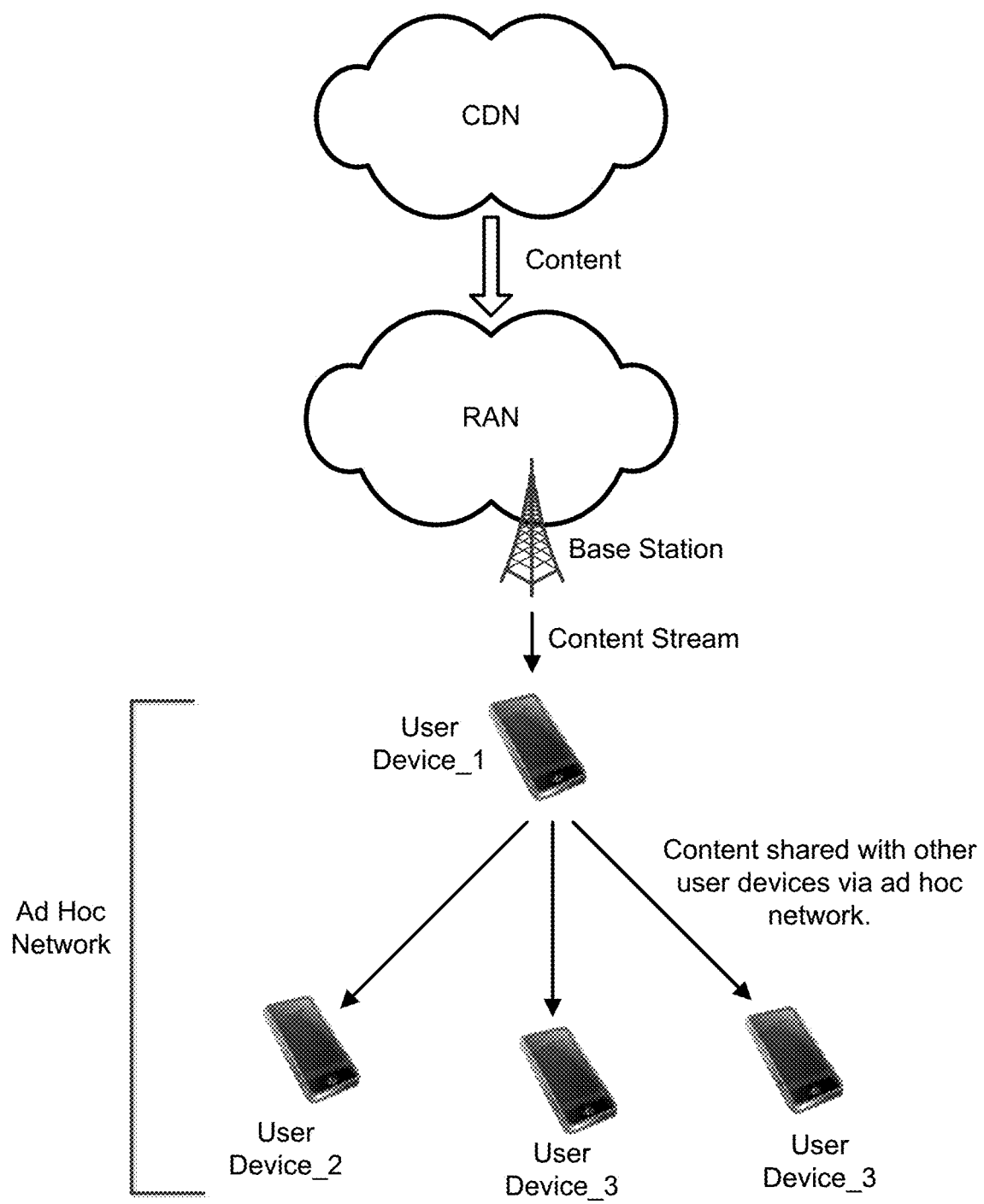
FIG. 1 is a diagram illustrating an overview of concepts described herein.

FIG. 1 is a diagram illustrating an overview of concepts described herein. As shown in FIG. 1, content may be delivered from a content delivery network ("CDN"). The CDN may represent, for example, one or more devices that store video, audio, or other content for delivery to user devices. The user devices may include smart phones, tablets, laptop computers, or other devices that obtain network connectivity through a wireless cellular network, such as by connecting to base stations in a RAN of a cellular network.

As illustrated, a content stream, such as a video stream, may be provided to a user device (user device_1) through the RAN of the cellular wireless network. User device_1 may be in communication with a number of other devices (illustrated as user device_2, user device_3, and user device_4), such as through an ad hoc network based on a short range wireless standard, e.g. Bluetooth or WiFi, in which the user devices directly communicate with one another. Through the ad hoc network, the various user devices may discover and communicate with one another. User device_1 may inform the other user devices that content is being streamed to the user device and is available for viewing at the other user devices. In response to one of the other user devices (i.e., user device_2, user device_3, or user device_4) indicating a desire to view the content, user device_1 may begin to stream the content, over the ad hoc network, and to the destination user device. The destination user device may thus view the content potentially without using radio resources of the RAN.

Assume that user device_2 represents the destination user device to which user device_1 is to provide content over the ad hoc network. In some implementations, before providing the content to user device_2, user device_1 may authenticate user device_2, such as by verifying that user device_2 is eligible to receive the content. Alternatively or additionally, in some implementations, authenticating user device_2 may include determining that user device_2 also obtains telecommunications services from the telecommunications provider associated with user device_1. In this situation, the telecommunications provider may modify billing data associated with user device_1 and/or user device_2. For example, the telecommunications provider may credit user device_1 for the bandwidth saved (or for a portion of the bandwidth saved) by providing user device_2 the content over the ad hoc network. As another example, a charge for the data corresponding to the content may be split between user device_1 and user device_2.

In some implementations, user device_1 and/or the other user devices may buffer an incoming content stream. By buffering the content stream, the other user devices may begin playback of the content stream at a location in the content stream prior to the current location at which user device_1 is viewing the content stream.

In yet other implementations, the creation of the ad hoc network and/or the forwarding of the content may be initiated based on common membership in social networks associated with the user device and the other user devices. For example, a user of user device_1 may "check-in" with a social network providing the current location of user device_1 to the social network. Contacts, within the social network, associated with the user of user device_1, may obtain the location of user device_1, which may be used to enable or assist in the creation of the ad hoc network.

Figure 2:
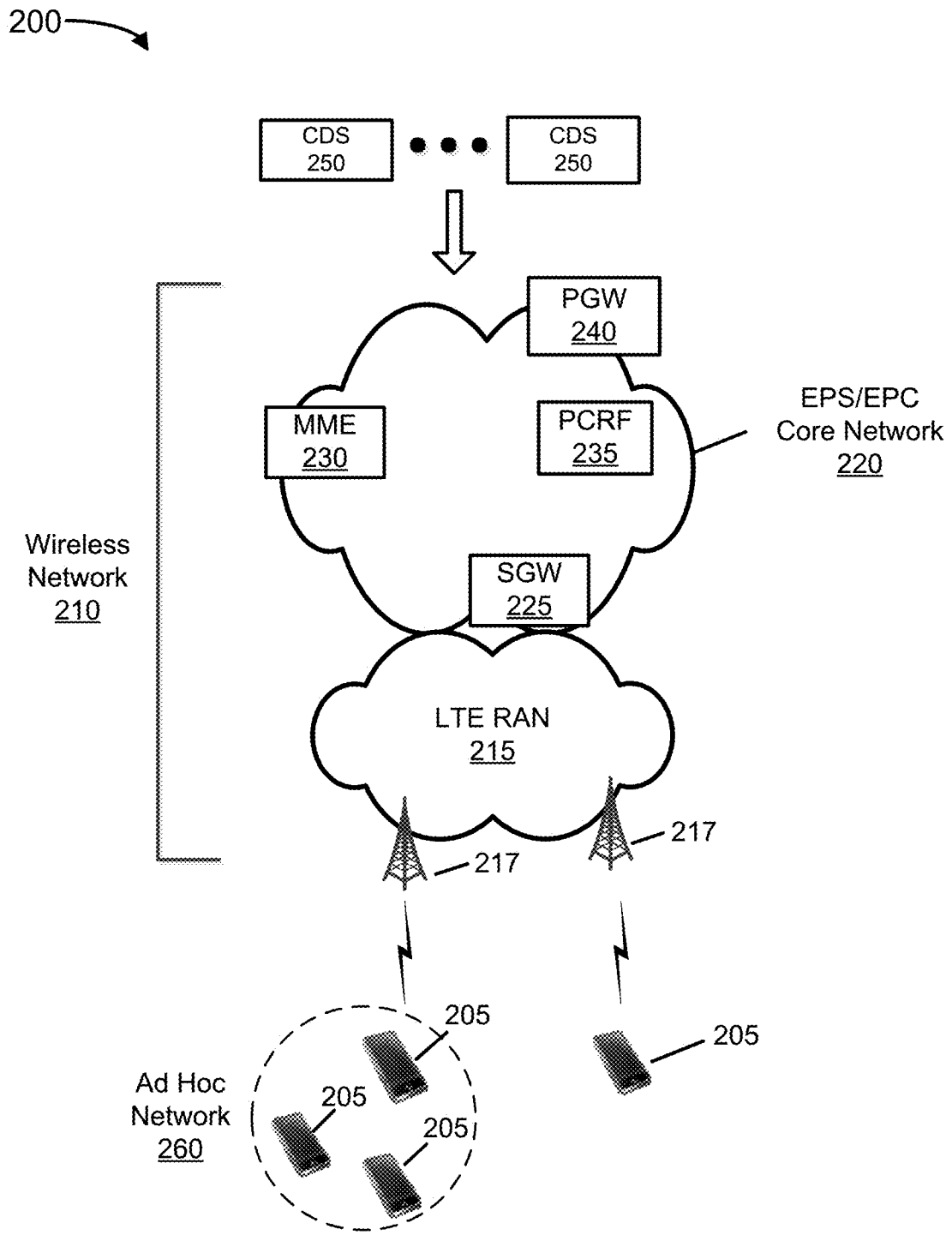
FIG. 2 is a diagram illustrating an example environment in which systems and/or methods described herein may be implemented.

FIG. 2 is a diagram illustrating an example environment 200 in which systems and/or methods described herein may be implemented. As shown in FIG. 2, environment 200 may include wireless network 210, which may include a cellular wireless network that provides network connectivity to user devices 205. Content delivery servers ("CDSs") 250 may provide content, such as streaming audio or video data, to user devices 205. Although illustrated as being implemented externally to wireless network 210, in one implementation, CDSs 250 may be located within wireless network 210. Alternatively or additionally, CDSs 250 may be located near user devices 205 (i.e., at "edge" locations of the network) in order to more efficiently deliver the content to user devices 205.

Wireless network 210 may include a Long Term Evolution ("LTE")-based RAN 215 and an evolved packet system ("EPS")/evolved packet core ("EPC") network 220 that operate based on a third generation partnership project ("3GPP") wireless communication standard. LTE RAN 215 may include one or more base stations 217, some or all of which may take the form of an eNodeB ("eNB"), via which user devices 205 may communicate via licensed frequency bands (e.g., licensed from a government entity) using a wireless cellular architecture. EPS/EPC core network 220 may include one or more serving gateways ("SGW") 225, mobility management entity devices ("MME") 230, Policy and Charging Rules Function ("PCRF") 235, and packet data network ("PDN") gateways ("PGW") 240. SGWs 225, MMEs 230, PCRF 235, and/or PGWs 240 may enable user devices 205 to communicate with external networks and/or to receive content from CDSs 250.

User devices 205 may include a computation and communication device, such as wireless mobile communication devices that are capable of communicating with one or more networks. For example, user devices 205 may include a radiotelephone; a personal communications system ("PCS") terminal (e.g., a device that combines a cellular radiotelephone with data processing and data communications capabilities); a personal digital assistant ("PDA") (e.g., a device that can include a radiotelephone, a pager, Internet/intranet access, etc.); a smart phone; a laptop computer; a tablet computer; a camera; a set-top device ("STD"), a personal gaming system, and/or another type of mobile computation and communication device.

Base stations 217 may include one or more network devices that receive, process, and/or transmit traffic via a radio (i.e., air) interface with user devices 205. In one example implementation, base stations 217 may be eNB devices that are part of LTE RAN 215. Base stations 217 may connect user devices 205 to EPS/EPC core network 220.

SGW 225 may include one or more network devices that gather, process, search, store, and/or provide information. For example, SGW 225 may include a gateway, a router, a modem, a switch, a firewall, a network interface card ("NIC"), a hub, a bridge, a proxy server, or some other type of device that processes and/or transfers traffic. SGW 225 may also aggregate traffic received from an external network and/or another network (e.g., via PGW 240) and may send the aggregated traffic to user devices 205 via one or more base stations 217.

MME 230 may include one or more computation and communication devices that gather, process, search, store, and/or provide information. For example, MME 230 may perform operations to register user devices 205 with the EPS, to establish bearer channels associated with a session with user devices 205, to hand off user devices 205 between base stations 217, and/or to perform other operations. MME 230 may perform policing operations on traffic destined for and/or received from user devices 205.

PCRF 235 may include one or more server devices that provide policy and charging control decisions. PCRF 235 may receive information regarding policies and/or subscriptions from one or more sources, such as subscriber databases and/or from one or more users (such as, for example, an administrator associated with PCRF 235). PCRF 235 may provide policy information, such as specific quality of service ("QoS") policies that should be enforced for a particular traffic flow, to a policy enforcement function, such as a policy enforcement function implemented by PGW 240.

PGW 240 may include one or more network devices, or other types of computation and communication devices, that gather, process, search, store, and/or provides information to act as a gateway for wireless network 210. PGW 240 may aggregate traffic received from one or more SGWs 225, and may send the aggregated traffic to an external network and/or to CDSs 250. PGW 240 may also, or alternatively, receive traffic from an external network and/or CDS 250, and may send the traffic toward user devices 205 via SGW 225, and/or base stations 217.

As illustrated in FIG. 2, user devices, in addition to connecting to wireless network 210, may connect to one another via short range (e.g., unlicensed band) wireless interfaces. For example, a particular user devices 205 may form ad hoc network 260 with other user devices 205 that are within range of the particular user device. A wireless ad hoc network may be a decentralized type of wireless network that does not rely on a pre-existing infrastructure, such as routers in wired networks or base stations. The wireless ad hoc network may be based on, for example, WiFi radio connections (e.g., via WiFi Direct), Bluetooth connections, or other wireless technologies. In one implementation, ad hoc network 260 may represent a wireless mesh network.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

Figure 3:
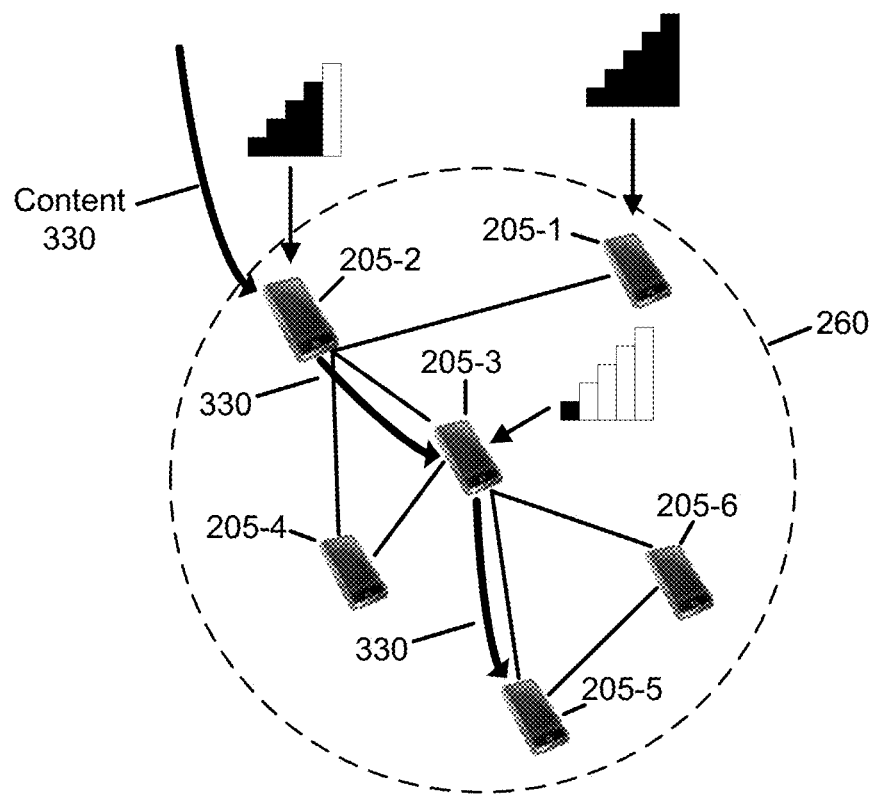
FIG. 3 is a diagram illustrating an example of an ad hoc network in additional detail.

FIG. 3 is a diagram illustrating an example of an ad hoc network 260 in additional detail. As illustrated, assume that six user devices, labeled as user devices 205-1 through 205-6, participate in an ad hoc network 260, such as an ad hoc network implemented using WiFi Direct radio communications.

Lines between user devices 205 may represent direct wireless connections. For example, user device 205-1 may be directly connected to user device 205-2 and indirectly connected to user devices 205-3 through 205-6 using user device 205-2 as an intermediate network node.

The various user devices 205, in ad hoc network 260, may be associated with different quality of service connection levels with respect to a cellular network, such as wireless network 210. As illustrated, user devices 205-1 and 205-2 may include relatively strong connections to wireless network 210. For example, user device 205-1 may be associated with a connection with wireless network 210 that may be graphically represented, to the user of user device 205-1, as five out of five possible "bars." Similarly, user device 205-2 may be associated with a connection represented by four out of five bars, and user device 205-3 may be associated with a connection represented by one out of five bars (i.e., poor connection quality).

As previously mentioned, content, such as streaming video content, that is received by one user device 205, via wireless network 210, may be shared (i.e., transmitted to) with other user devices 205 via ad hoc network 260. For example, a user device with a good connection to wireless network 210 (e.g., user device 205-1 or user device 205-2) may share streaming video with one or more of user devices 205 that are associated with a poor network connection (e.g., user device 205-3). In this manner, a device with a poor network connection to wireless network 210 may still be able to receive the video stream. As particularly illustrated in FIG. 3, content 330, such as a video stream, may be transmitted to user device 205-2, which may share content 330 with user device 205-3, which may further share content 330 with user device 205-5. In some implementations, a user device, such as user device 205-3, may use ad hoc network 260 to supplement data from wireless network 210. For example, user device 205-3 may receive a first portion of content 330 from user device 205-2 and a second portion of content 330 from wireless network 210. User device 205-3 may assemble the received data, corresponding to content 330, into a single content stream that may be shown to the user of user device 205-3.

In some implementations, an operator of wireless network 210 may adjust billing information, for user devices 205, based on content sharing in ad hoc network 260. For example, the account associated with a user device that shares content with another user device, in ad hoc network 260, may be credited with a bandwidth credit (e.g., by adjusting a bandwidth cap associated with the user device), a monetary credit (or some other type of credit). Alternatively or additionally, the account of the user device that receives the shared stream may be debited or otherwise charged for a portion of the bandwidth corresponding to the content stream. In this manner, multiple user devices may share the cost associated with a content stream.

Figure 4:
FIG. 4 illustrates example functional components of a user device.

FIG. 4 illustrates example functional components of one of user devices 205. As shown, user device 205 may include ad hoc network component 410, content availability component 420, and content buffer 430. In other implementations, user device 205 may include additional, fewer, different, or differently arranged components. In some implementations, the functionality described below with regard to one component may be performed in whole or in part by one or more other components.

Ad hoc network component 410 may include logic to manage the joining, authentication, and participation, of user device 205, in ad hoc networks. Ad hoc network component 410 may, for example, scan the ad hoc wireless spectrum, monitor for the presence of other user devices 205, or otherwise perform device discovery operations to discover other user devices 205 that are eligible to participate in ad hoc network 260. In some implementations, device discovery for ad hoc network 260 may be performed using wireless network 210. For example, identification and/or location information may be transmitted through wireless network 210. In this manner, based on communications through wireless network 210, user devices 205 may discover one another and/or authenticate one another for participation in ad hoc network 260. In some implementations, device discovery may be performed and/or filtered based on membership in social networks. For example, ad hoc network 260 may be formed from user devices 205 that participate in a particular social network and/or belong to a particular group associated with the social network.

Content availability component 420 may include logic to determine when content is available for viewing or downloading from another user device 205 that is in ad hoc network 260. Content availability component 420 may, for example, receive, over ad hoc network 260, indications of content that is available to download. In one implementation, content availability component 420 may alert the user, such as through a visual or audible notification, when new content is available for viewing.

Content buffer 430 may include one or more logical or physical buffers to store content, such as content received from wireless network 210 and/or content received from other user devices 205 in ad hoc network 260. By buffering incoming content, the content may be presented at a later time. Additionally, content shared with another user device 205 may be shared from a point in time earlier than the current time. That is, two users can potentially be viewing a particular item of content at different playback locations in the item of content. In some implementations, content buffer 430 may be omitted and/or digital rights management restrictions associated with the content may indicate that the content should not be buffered. In this situation, playback of the content, at both the user device that originally receives the content from wireless network 210 and at any sharing user devices, may be limited to "live" (i.e., not buffered) content.

Figure 5:
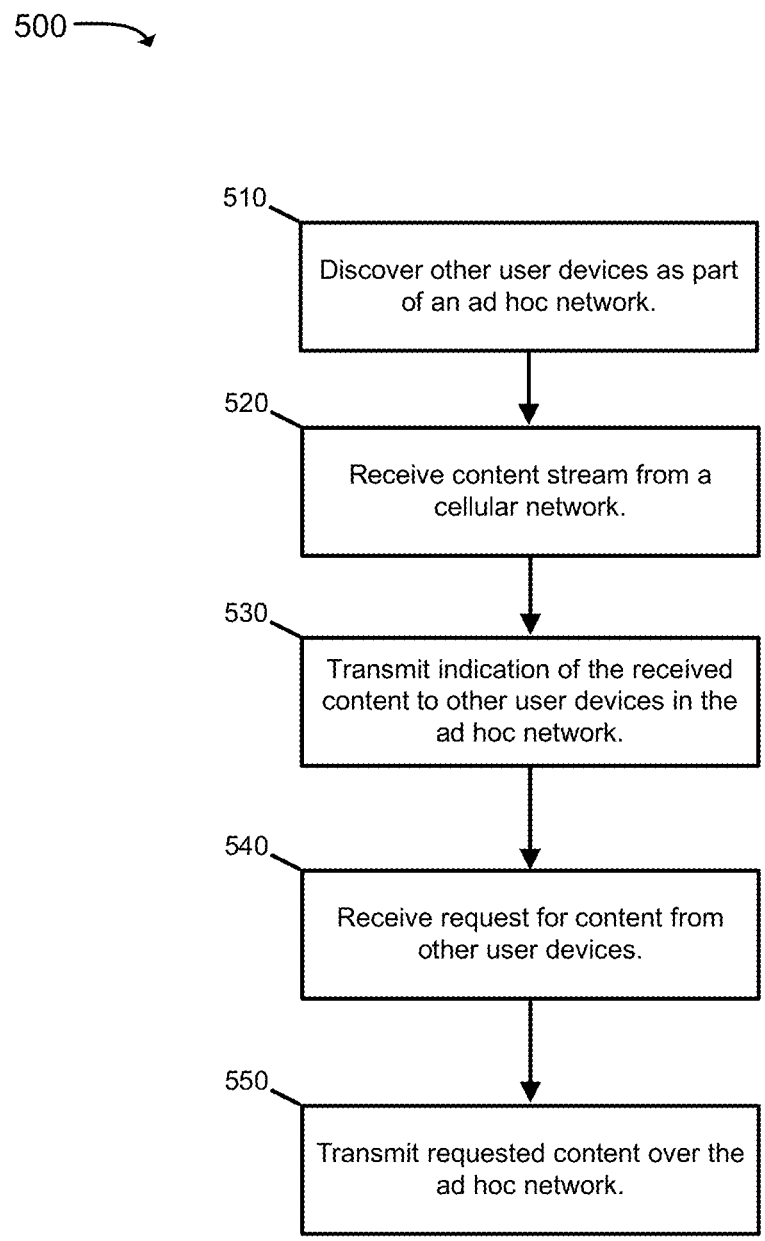
FIG. 5 is a flowchart illustrating an example process for streaming content using an ad hoc network.

FIG. 5 is a flowchart illustrating an example process 500 for streaming content using an ad hoc network. Process 500 may be performed by, for example, user device 205 that is connected to wireless network 210 and that receives content from wireless network 210.

Process 500 may include discovering other user devices as part of an ad hoc network (block 510). A number of techniques may be used to discover, create and/or join ad hoc networks that are within range of user device 205. For example, as previously mentioned, ad hoc network component 410 may include logic to manage the joining, authentication, and participation, of user device 205, in ad hoc networks. In some implementations, ad hoc networks may be dynamically formed with any compatible user devices 205 that are within range of one another. In other implementations, only certain user devices 205 may be permitted to join a particular ad hoc network 260. For example, only user devices associated with a particular telecommunications provider, such as the telecommunications provider associated with wireless network 210, may be permitted to join ad hoc network 260. In this situation, data costs and/or account credits associated with the user devices may be shared or split based on the sharing of content in the ad hoc network. As another example, only user devices associated with a particular social network, or a particular group within the social network, may be permitted to join ad hoc network 260. As yet another example, a group of user devices 205 may subscribe to a particular video streaming service. Only user devices that subscribe to the video streaming service may be permitted to join ad hoc network 260, thus ensuring that content, from the particular video streaming service, will only be shared among user devices 205 that have permission to view content associated with the particular video streaming service.

In one implementation, wireless network 210 may be used to facilitate discovery of user devices for ad hoc network 260. For example, one or more devices in, or associated with, wireless network 210 may facilitate user device discovery, for ad hoc network 260, by monitoring presence (e.g., whether a user device is active and attached to wireless network 260) and location information associated with user devices 205.

Process 500 may further include receiving a content stream from a cellular network (block 520). The content stream may include a content stream transmitted from CDSs 250 to user device 205. The content stream may include, for example, a video or audio stream.

Process 500 may further include transmitting an indication of the received content stream to other user devices in the ad hoc network (block 530). The indication may be transmitted by content availability component 420 via ad hoc network 260. In some implementations, the received content stream may only be indicated as available to other user devices when a user explicitly indicates that the content should be made available for sharing. Alternatively, all content that is eligible for sharing via ad hoc network 260 (e.g., all content that is not associated with digital rights management restrictions that indicate that it is not available for sharing) may be automatically indicated as being available for sharing (e.g., without user intervention).

At some point, other user devices 205, in ad hoc network 260, may request reception of the content that was indicated as being available for sharing (i.e., as indicated in block 530). Process 500 may include receiving a request for content from other user devices 205 in ad hoc network 260 (block 540).

In response to the received request, process 500 may further include transmitting the requested content over the ad hoc network (block 550). In some implementations, before transmitting the requested content, the user device that receives the request may authenticate the destination user device as being eligible to receive the content. In some implementations, transmitting the content to the destination user device may result in a billing credit or other account credit associated with the user device that transmits the content. As previously discussed with respect to ad hoc network 260, transmitting content over ad hoc network 260 may include transmitting the content to one or more intermediate user devices that forward the content towards the final destination user device.

Figure 6:
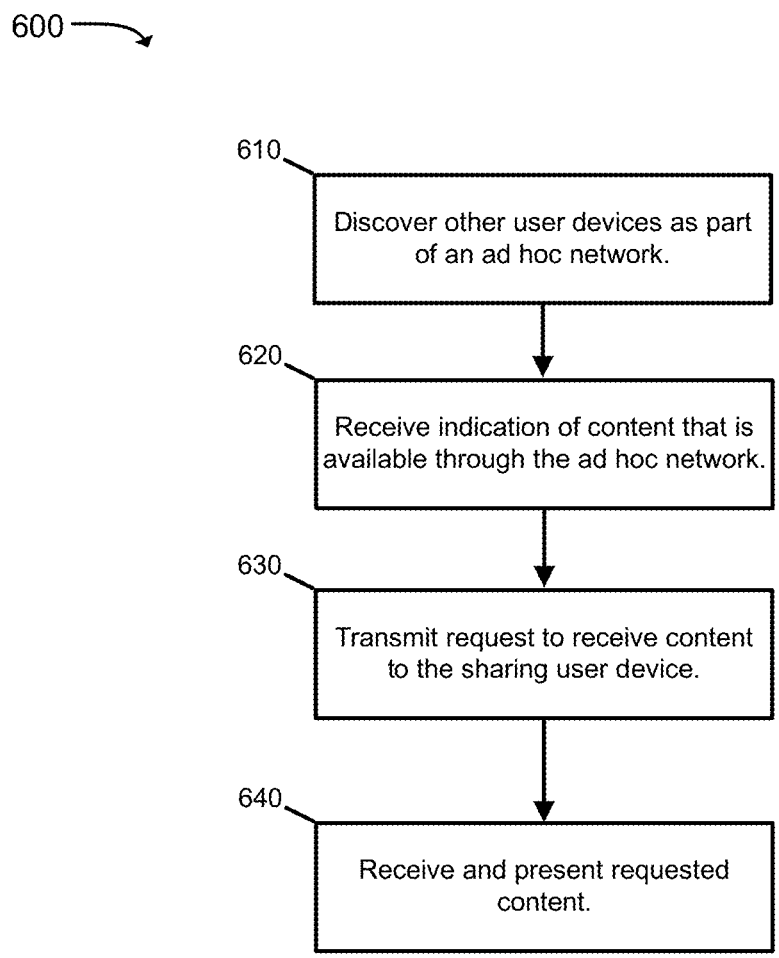
FIG. 6 is a flowchart illustrating an example process for receiving content over an ad hoc network.

FIG. 6 is a flowchart illustrating an example process 600 for receiving content over an ad hoc network. Process 600 may be performed by, for example, one of user devices 205.

Process 600 may include discovering other user devices as part of an ad hoc network (block 610). Block 610 may be performed similarly to block 510 (FIG. 5). As mentioned, ad hoc network component 410 may include logic to manage the joining, authentication, and participation, of user device 205, in ad hoc networks.

Process 600 may further include receiving an indication of content that is available through the ad hoc network (block 620). The indication of the available content may be received from other user devices 205 that are connected to ad hoc network 260. The indication of the available content may be provided to the user of the user device. For example, the user may be notified, such as via a visual or audible notification, that content is available for streaming over ad hoc network 260.

Figure 7:
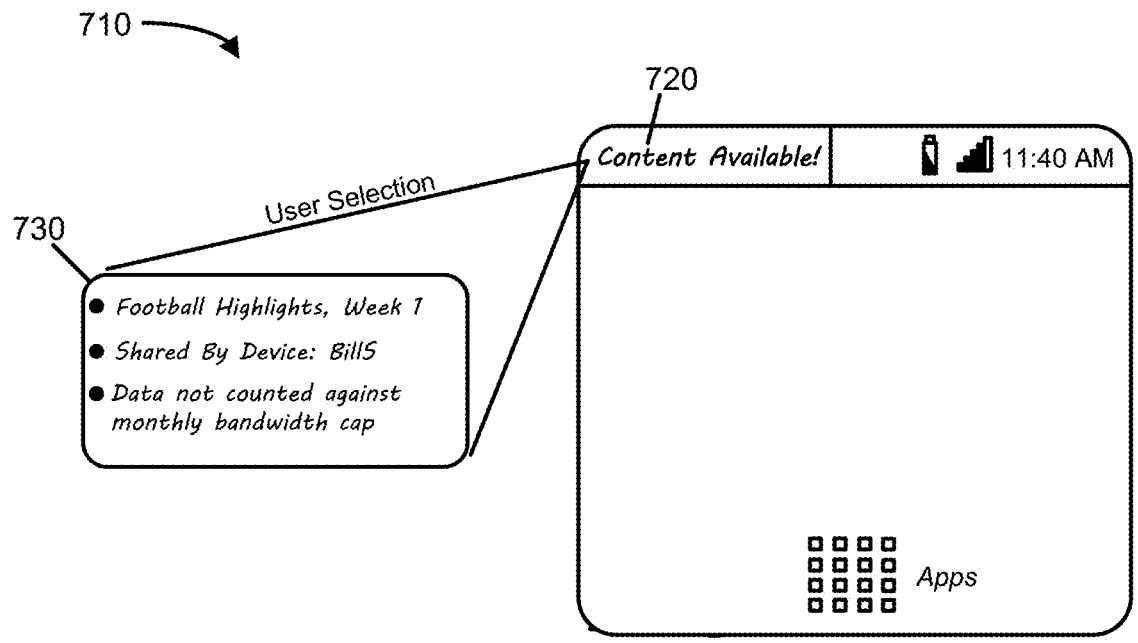
FIG. 7 is a diagram illustrating an example of an interface that may provide an indication of available content.

In one implementation, the indication of the available content may be provided in a notification area of a mobile operating system. FIG. 7 is a diagram illustrating an example of an interface 710, displayed by user device 205, that may provide an indication of available content. Interface 710 may, for example, represent a graphical interface provided by a smart phone. As shown, interface 710 may include a notification area 720. In this example, assume that when an indication of available content is received by user device 205, interface 710 displays a message, in notification area 720, indicating that the content is available ("Content Available!"). The message may be accompanied by, for example, an audible or vibration based alert. The user may select the message (e.g., via a touch interface) to obtain additional information relating to the content. An example of additional information is illustrated in window 730. In this example, window 730 includes a title of the content ("Football Highlights, Week 1"), identification of the user device that is sharing the content ("from device: BillS"), and information relating to billing for the bandwidth for the content ("Data not counted against monthly bandwidth cap"). The information in window 730 may be obtained from the indication of available content (e.g., from a message including the indication of available content). In one implementation, the information relating to billing for the bandwidth may be obtained, by the user device that originally receives the content from wireless network 210 (e.g., such as from PCRF 235 in wireless network 210).

Referring back to FIG. 6, at some point, the user may desire to receive and/or view content that is being shared over ad hoc network 260. The user may, for example, select a particular shared content item, such as "Football Highlights, Week 1," to view. Based on the selection, a request may be transmitted, for the particular shared content item, to the device that is sharing the content (block 630). The request may include, for example, a message transmitted through ad hoc network 260.

The sharing user device may forward, via ad hoc network 260, the requested content item. The requested content item may thus be received and presented to the user (block 640). For example, a particular video may be received over ad hoc network 260 and played back to the user. In some implementations, instead of immediately playing back the content, the receiving user device may buffer (store) the content for later viewing.

As was previously mentioned, in some implementations, content shared over ad hoc network 260 may be "live" streaming content that is not buffered, or not significantly buffered by the receiving device. In this situation, the transmitting user device and the receiving user device may simultaneously view the same content. Alternatively or additionally, a receiving user device may buffer the received content. The operation of a buffer, such as content buffer 430, of user device 205, will be next be described in more detail.

Figure 8:
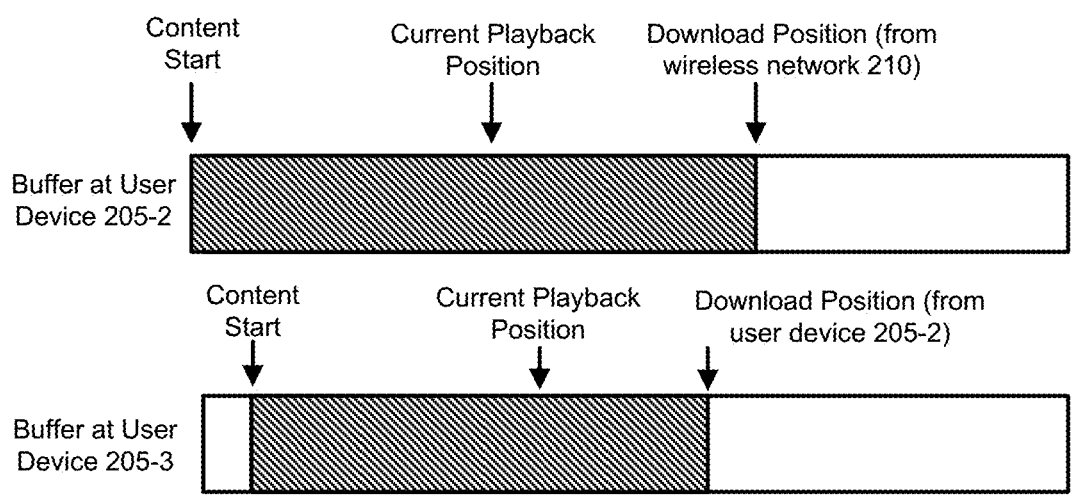
FIG. 8 is a diagram illustrating the buffering of content by a user device.

FIG. 8 is a diagram illustrating the buffering of content by a user device. Two user devices 205-2 and 205-3 are illustrated. Assume that user device 205-2 receives content from wireless network 210 and that user device 205-3 receives the content, via ad hoc network 260, from user device 205-2. As illustrated, the buffer at user device 205-2 may store the content as it is received from wireless network 210. The downloaded content is illustrated, in FIG. 8, with shading. The current playback position ("Current Playback Position") of the content, at user device 205-2, may be between the start of the content buffering ("Content Start") and the most recent downloaded portion of the content ("Download Position").

At some point, assume user device 205-2 begins to share the content with user device 205-3. User device 205-3 may buffer the received content. As illustrated, in this example, user device 205-3 may buffer the content beginning at a location after the start of the content (at user device 205-2). The user associated with user device 205-3 may begin playback of the content at any position between the content start and the current download position. In this manner, content being shared and viewed by different user devices 205, associated with ad hoc network 260, may be asynchronously played back by the different user devices.

Figure 9:
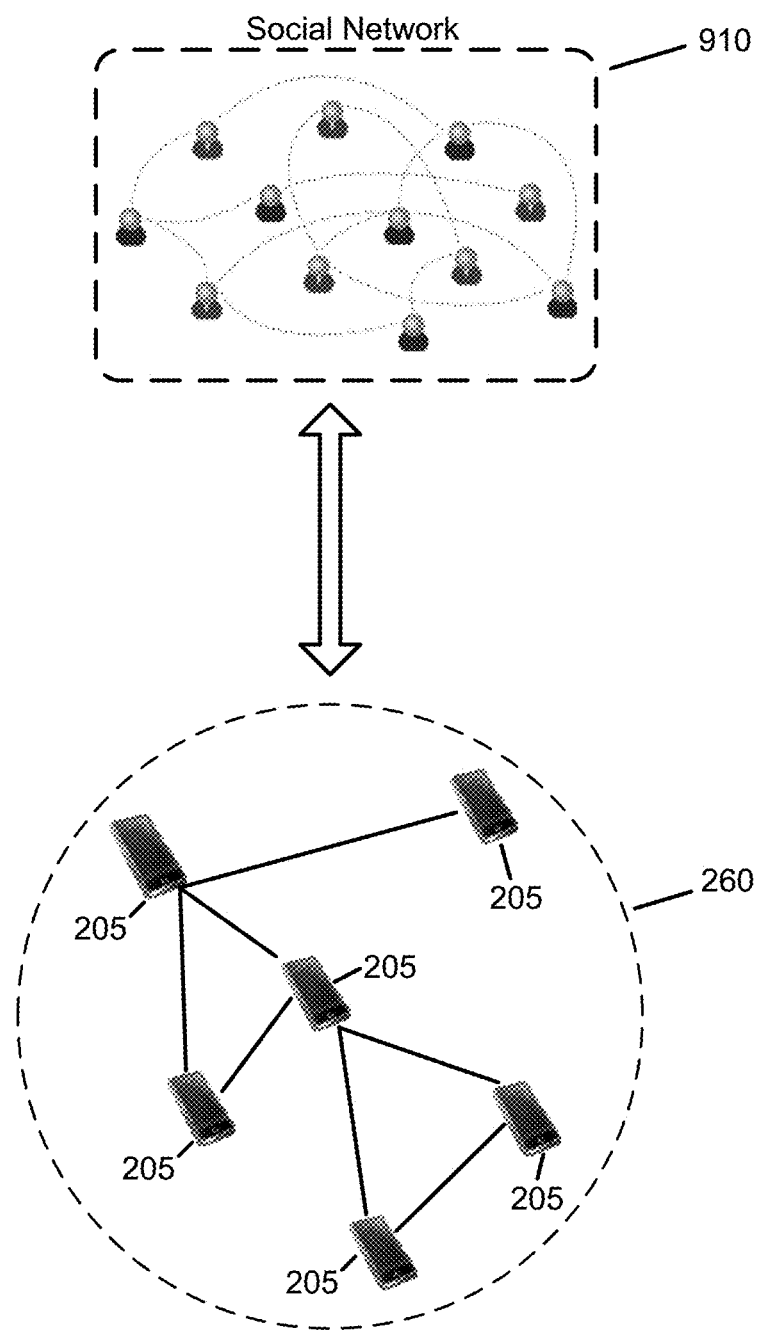
FIG. 9 is a diagram illustrating an example of the creation of an ad hoc network based on membership in a social network or other group.

FIG. 9 is a diagram illustrating an example of the creation of an ad hoc network based on membership in a social network or other group. As illustrated, social network 910 may include a number of users, which may each be associated with user devices 205. In one implementation, device discovery for ad hoc network 260 may be based on membership in social network 910. For example, only user devices 205 that are members of social network 910 may be joined to ad hoc network 260. In some implementations, the current ad hoc network 260, for which a particular user device 205 is a member, may be provided to social network 910. For example, a social network status message associated with a particular user may indicate that the user is associated with an ad hoc network in a particular geographical location (e.g., the user's status may indicate the status "in an ad hoc network on K street, come join."). Other users may view the user's status and may actively move towards the indicated geographical location in order to join the ad hoc network to share content. As more users join the ad hoc network, the geographical scope of the ad hoc network may increase.

For some social networks, users may occasionally "check-in" at locations providing the current location to the social network. In some implementations, the corresponding "check-in" location of a user device may be used as part of device discovery for ad hoc network 260.

As another example, social network 910 may represent customers of the telecommunications provider that provides wireless network 210. In this case, membership in ad hoc network 260 may be limited to user devices that obtain wireless service from the telecommunications provider.

FIG. 10 is a diagram of example components of a device 1000. One or more of the devices described above (e.g., as described with respect to FIGS. 1, 2, 3, and 9) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In one implementation, processor 1020 may include a dedicated encoding component. For example, a set-top box may include a general purpose processor and one or dedicated encoders/decoders. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 6, the order of the blocks may be modified in other implementations. Further, non-dependent blocks may be performed in parallel. In some implementations, additional blocks may be performed before, after, or in between the described blocks.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    joining, by a user device and via direct wireless connections with other user devices, an ad hoc network including the other user devices, the joining including:
        communicating through a radio access network (RAN) of a cellular wireless network,
        obtaining device discovery information, via the communication through the RAN of the cellular wireless network, the device discovery information including location information of the other user devices, and
        initiating the direct wireless connections, to form the ad hoc network, based on the obtained location information;
    receiving, by the user device, a content stream from the cellular wireless network;
    transmitting, by the user device and via the ad hoc network, an indication of the content stream, received from the cellular wireless network, to the other user devices in the ad hoc network;
    receiving, by the user device and from one or more of the other user devices in the ad hoc network, a request for the content stream;
    forwarding, by the user device and via the ad hoc network, the content stream to the one or more of the other user devices in the ad hoc network, to provide the content stream to the one or more other user devices without using the cellular wireless network to transmit the content stream to the one or more other user devices; and
    presenting, by the user device, the content stream.

2. The method of claim 1, further comprising:
    buffering the received content stream at the user device, and
    wherein forwarding of the content stream to the one or more of the other user devices includes forwarding, using the buffer, previously received content in the content stream to the one or more other user devices.

3. The method of claim 1, further comprising:
    authenticating the one or more other devices as being authorized to view the content stream before forwarding the content streamed to the one or more of the other user devices.

4. The method of claim 1, wherein the location information, of the device discovery information, is determined based on a location check-in operation that is performed with respect to a social network.

5. The method of claim 1, further comprising:
    receiving, from at least one of the one or more other user devices in the ad hoc network, an indication of other content available to be received, from the at least one of the one or more other user devices, via the ad hoc network; and
    transmitting, to the at least one of the one or more other user devices, a request for the other content.

6. The method of claim 1, wherein forwarding the content stream to the one or more of the other user devices in the ad hoc network triggers a billing or bandwidth credit to an account associated with a user of the user device and the cellular wireless network.

7. The method of claim 1, wherein the forwarding of the content stream to the one or more of the other user devices in the ad hoc network is performed over the direct wireless communications of the ad hoc network.

8. The method of claim 1, wherein the initiating of the direct wireless connections, based on the location information, includes using the location information to determine those of the other user devices that are within range of a direct wireless connection with the user device.

9. A user device comprising:
    a non-transitory computer-readable medium to store a set of computer-executable instructions; and
    a processor configured to execute the set of computer-executable instructions, wherein executing the set of computer-executable instructions causes the processor to:
        join an ad hoc network including other user devices, the ad hoc network being implemented via direct wireless connections with the other user devices, the joining of the ad hoc network including:
            communicating through a radio access network (RAN) of a cellular wireless network,
            obtaining device discovery information, via the communication through the RAN of the cellular wireless network, the device discovery information including location information of the other user devices, and
            initiating the direct wireless connections, to form the ad hoc network, based on the obtained location information;
        receive a content stream from the cellular wireless network;
        transmit, via the ad hoc network, an indication of the content stream, received from the cellular wireless network, to the other user devices in the ad hoc network;
        receive, from one or more of the other user devices in the ad hoc network, a request for the content stream;
        forward, based on the received request and via the ad hoc network, the content stream to the one or more of the other user devices in the ad hoc network, to provide the content stream to the one or more other user devices without using the cellular wireless network to transmit the content stream to the one or more other user devices; and
        present the content stream to a user of the user device.

10. The user device of claim 9, wherein executing the set of computer-executable instructions further causes the processor to:
buffer the received content stream at the user device, and
wherein forwarding of the content stream to the one or more of the other user devices includes forwarding, using the buffer, previous content in the content stream to the one or more other user devices.

11. The user device of claim 9, wherein executing the set of computer-executable instructions further causes the processor to:
authenticate the one or more other devices as being authorized to view the content stream before forwarding the content streamed to the one or more of the other user devices.

12. The user device of claim 9, wherein executing the set of computer-executable instructions further causes the processor to:
receive, from at least one of the one or more other user devices in the ad hoc network, an indication of content available to be received, from the at least one of the one or more other user devices, via the ad hoc network; and
transmit, to the at least one of the one or more other user devices, a request to receive the content.

13. The user device of claim 9, wherein forwarding the content stream to the one or more of the other user devices in the ad hoc network triggers a billing or bandwidth credit to an account associated with a user of the user device.

14. The user device of claim 9, wherein the location information, of the device discovery information, is determined based on a location check-in operation that is performed with respect to a social network.

15. The user device of claim 9, wherein the forwarding of the content stream to the one or more of the other user devices in the ad hoc network is performed over the direct wireless communications of the ad hoc network.

16. The method of claim 1, wherein the initiating of the direct wireless connections, based on the location information, includes using the location information to determine those of the other user devices that are within range of a direct wireless connection with the user device.

17. A non-transitory computer readable medium including instructions, that when executed by a processor associated with a user device, cause the processor to:
join, via direct wireless communication with other user devices, an ad hoc network including the other user devices, the joining including:
communicating through a radio access network (RAN) of a cellular wireless network,
obtaining device discovery information, via the communication through the RAN of the cellular wireless network, the device discovery information including location information of the other user devices, and
initiating the direct wireless connections, to form the ad hoc network, based on the obtained location information;
receive a content stream from the cellular wireless network;
transmit, via the ad hoc network, an indication of the content stream, received from the cellular wireless network, to the other user devices in the ad hoc network;
receive from one or more of the other user devices in the ad hoc network, a request for the content stream;
forward, based on the received request and via the ad hoc network, the content stream to the one or more of the other user devices in the ad hoc network, to provide the content stream to the one or more other user devices without using the cellular wireless network to transmit the content stream to the one or more other user devices; and
present the content stream.

18. The non-transitory computer readable medium of claim 17, wherein the instructions further cause the processor to:
buffer the received content stream at the user device, and
wherein forwarding of the content stream to the one or more of the other user devices includes forwarding, using the buffer, previously received content in the content stream to the one or more other user devices.

19. The non-transitory computer readable medium of claim 17, wherein the instructions further cause the processor to:
authenticate the one or more other devices as being authorized to view the content stream before forwarding the content streamed to the one or more of the other user devices.

20. The non-transitory computer readable medium of claim 17, wherein the initiating of the direct wireless connections, based on the location information, includes using the location information to determine those of the other user devices that are within range of a direct wireless connection with the user device.

* * * * *